March 18, 1958  T. T. HEDRICK ET AL  2,827,308
TANDEM TRACTOR HITCH
Filed March 16, 1954
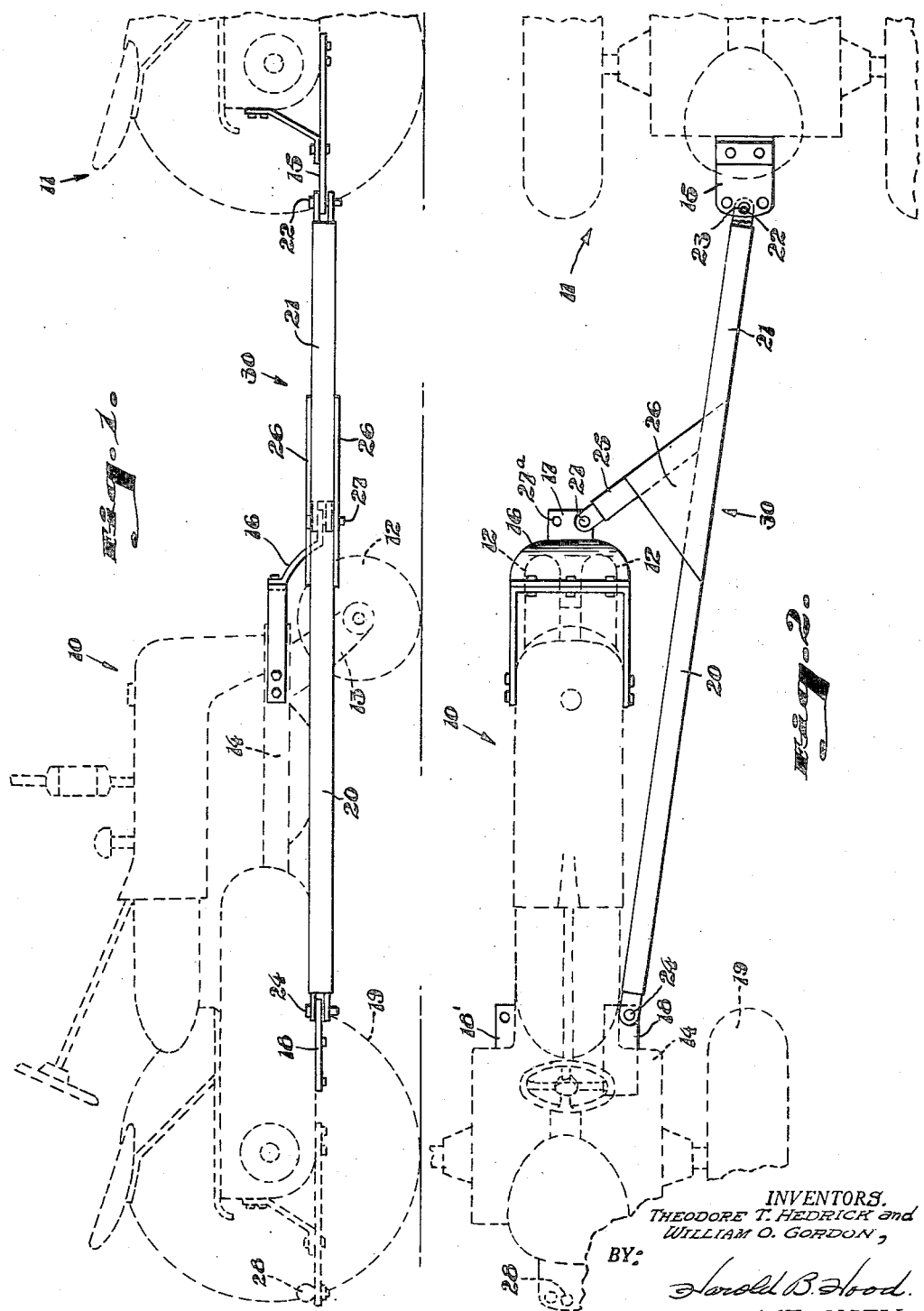
INVENTORS.
THEODORE T. HEDRICK and
WILLIAM O. GORDON,
BY: Harold B. Hood.
ATTORNEY.

United States Patent Office 2,827,308
Patented Mar. 18, 1958

2,827,308

TANDEM TRACTOR HITCH

Theodore T. Hedrick, Lewisville, and William O. Gordon, Connersville, Ind., assignors to Theodore T. Hedrick, trustee Application March 16, 1954, Serial No. 416,574

3 Claims. (Cl. 280—472)

The present invention relates to a hitching device for connecting two farm tractors in tandem whereby the power from both tractors can be utilized for a particular job.

Tractors of a certain type are provided with caster-mounted front wheels closely spaced on opposite sides of the median plane of the tractor. We have found that such a tractor can be steered merely by applying a lateral force to the tractor chassis near the front wheels. The primary object of this invention, therefore, is to provide a hitching device of the above-mentioned character so constructed as to cause a tractor of the caster-wheeled type of follow a lead tractor and be steered solely by means of lateral pressure exerted near the front of the following tractor, thereby placing the following tractor under control of the operator on the lead tractor.

Another object is to provide such a hitching device which will cause the following tractor to travel along a path spaced laterally from the path of the lead tractor, whereby a farm implement can be fixed to each of the tractors to perform an operation upon adjacent rows of crops. Thus, a single operator can perform the task of two men operating separate tractors. Further objects will become apparent as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation showing our hitching device in position between two tractors; and Fig. 2 is a plan view of the device of Fig. 1.

Referring more particularly to the drawings, it will be seen that we have illustrated somewhat diagrammatically, and in dotted lines, a first tractor 10 and the rear end of a second tractor 11. It is intended that the two tractors be connected together in such a way that the tractor 10 will follow the lead tractor 11 without the need of an operator on tractor 10. To this end, we provide a frame, referred to generally by the reference numeral 30.

Tractor 10 is of the type having the front wheels 12 mounted closely adjacent the median plane of tractor 10 upon a caster-type support 13 fixed to the forward end of the tractor chassis 14. Lead tractor 11 may be of a similar type, but not necessarily so, and is conventionally provided with a rear hitch 15 near the median plane of said tractor.

In order to connect tractor 10 to the tractor 11 by means of the frame 30, we provide a first bracket 16 fixed to the front end of the chassis 14, of tractor 10, and including a substantially horizontal plate 17 near the median plane of said tractor. A second plate 18 is fixed to the tractor chassis on one side thereof and just ahead of the rear wheels 19 of tractor 10.

Frame 30 comprises a first bar member 20, the forward end of which constitutes a tongue 21. Said tongue is connected to hitch 15 in any suitable manner, such as by means of the king-pin 22 passing through suitable bores in the tongue 21 and taking through an aperture 23 in the hitch 15. It will be noted that the diameter of aperture 23 is substantially larger than the diameter of the pin 22 to provide a relatively "loose" fit between the tongue and the hitch 15, whereby the frame 30 is permitted some degree of freedom relative to the hitch 15.

The rear end of the bar member 20 is similarly fixed to the plate 18 by means of a pin 24. Here again, the connection is made somewhat "loose" for a purpose later to become apparent.

A second bar member 25 is fixed to the bar member 20 intermediate the ends thereof and preferably forms an acute angle with said bar member. Gussets 26 are used to strengthen the connection between such bar members. The reason for the acute angular relation between bar members 20 and 25 is to position the connection between such bar members far enough ahead of the wheels 12 to permit proper clearance for the wheels for turning. Preferably, the bar member comprises two adjustably-associated pieces, so that its effective length may be adjusted to accommodate the assembly to tractors of varied constructions.

The free end of the bar member 25 is connected to the plate 17 by means of a pin 27, similar to the connection between the tongue 21 and the hitch 15. Because of the "loose" connection between the bar members and their respective plates, the frame 30 is permitted a limited amount of movement about a line through the axes of pins 24 and 27 to permit the elevation of tractor 10 to vary slightly relative to the elevation of tractor 11 as the tractors move over rough terrain.

A further plate 18' can be fixed to the opposite side of tractor 10, or the plate 18 may be transversely elongated to project from opposite sides of the frame, and a further aperture 27a can be provided in the plate 17 to permit the frame 30 to be inverted and connected on the opposite side of tractor 10.

It will be noted that the bar member 20 retreats from the median plane of the tractor 11 toward the median plane of the tractor 10. Tractor 10 is thereby caused to follow tractor 11 along a path laterally spaced from the path of tractor 11. A farm implement may be hooked to the hitch 15 on the side of the frame 30 opposite tractor 10, and another farm implement may be hooked to the hitch 28 of tractor 10 permitting adjacent rows of crops to be operated upon simultaneously with the need only of a single operator on the lead tractor 11.

It will be obvious, of course, that all controls of the tractor 10, with the exception of the steering mechanism, must be placed under the control of the operator on the lead tractor, but the mechanism for doing this has no connection with the invention here under consideration and has not, therefore, been illustrated or described.

We claim as our invention:

1. A hitching device for a tractor of the type having caster-mounted front wheels, said device comprising a first bracket fixed to the forward end of the chassis of said tractor and providing a first hitch near the median plane of said tractor, a second bracket fixed to the side of said tractor chassis and providing a second hitch offset from said median plane and between the front and rear wheels of said tractor, and a frame comprising a first bar member, means for connecting one end of said member to said first hitch, a second bar member, means for connecting one end of said second member to said second hitch with said member extending forward from said second hitch beyond said first hitch, while retreating laterally from said median tractor plane, to provide a tongue, and means fixing the other end of said first bar member to said second bar member intermediate the ends thereof, said means for connecting said first bar member to said first hitch and said means for connecting said second bar member to said second hitch each being of a character such as to permit limited swinging movement of said frame about the line through said first and second hitches.

2. A hitching device for a tractor of the type having caster-mounted front wheels, said device comprising a first bracket fixed to the forward end of the chassis of said tractor and providing a first hitch near the median plane of said tractor and ahead of the front wheels thereof, a second bracket supported from said tractor chassis to one side of said median plane and just forward of the rear wheels thereof to provide a second hitch, and a frame comprising a first bar member, means for connecting one end of said member to said first hitch, a second bar member, means for connecting one end of said second member to said second hitch, said second bar member extending forward from said second hitch and laterally away from said median tractor plane, and said first bar member extending forward from said first hitch and laterally away from said median tractor plane at an angle such as to meet said second bar member at a point intermediate the ends thereof, and means fixing said first bar member to said second bar member at such meeting point with said first and second bar members lying in a substantially horizontal plane, said second bar member extending forwardly beyond said meeting point to provide a tongue laterally spaced from said tractor median plane.

3. In combination with a pair of tractors, one of said tractors being of the type having caster-mounted front wheels, means for hitching said one tractor to the other of said tractors to cause said one tractor to follow said other tractor along a path spaced laterally from the median plane of said other tractor, said means comprising a hitch support on the rear of said other tractor near the median plane thereof, a first bracket fixed to said one tractor on the side thereof nearest said other tractor and at a point just forward of the rear wheels of said one tractor, a first bar member, means for connecting one end of said first bar to the hitch support on said other tractor, means for connecting the other end of said first bar member to said first bracket, said first bar member retreating from the median plane of said other tractor toward the median plane of said one tractor, a second bracket fixed to the forward end of said one tractor near the median plane thereof and ahead of the front wheels of that tractor, a second bar member fixed at one end to said first bar member at a point intermediate the end thereof, and means for fixing the other end of said second bar to said second bracket.

References Cited in the file of this patent
UNITED STATES PATENTS

| | | |
|---|---|---|
| 1,007,254 | Therens | Oct. 31, 1911 |
| 1,600,536 | Craig et al. | Sept. 21, 1926 |
| 1,646,342 | Barry | Oct. 18, 1927 |
| 1,963,478 | Swanson et al. | June 19, 1934 |
| 2,274,767 | Zink et al. | Mar. 3, 1942 |
| 2,432,417 | Heath | Dec. 9, 1947 |
| 2,658,770 | Koenig | Nov. 10, 1953 |